United States Patent

Ganske

[15] 3,641,265

[45] Feb. 8, 1972

[54] TELEVISION RECORDING SYSTEM WITH ALTERNATE PERIOD INVERSION AND AUTOMATIC FREQUENCY CONTROL

[72] Inventor: Kingston E. Ganske, Rough and Ready, Calif.

[73] Assignee: Arvin Industries, Inc., Columbus, Ind.

[22] Filed: Oct. 27, 1969

[21] Appl. No.: 869,662

[52] U.S. Cl. ....................................178/6.6 A, 178/69.5 TV

[51] Int. Cl......................H04n 5/12, H04n 5/78, H04n 7/12

[58] Field of Search .............178/6.6 A, 6.6 TC, 7.3 S, 7.5 S, 178/69.5 TV

[56] References Cited

UNITED STATES PATENTS

| | | | |
|---|---|---|---|
| 2,601,415 | 6/1952 | Oliver | 178/7.3 S |
| 2,678,347 | 5/1954 | Clothier | 178/7.5 S |
| 2,951,117 | 8/1960 | Macovski | 178/7.3 S |
| 3,487,167 | 12/1969 | Riggin | 178/7.3 S |

FOREIGN PATENTS OR APPLICATIONS

| | | | |
|---|---|---|---|
| 1,469,271 | 1/1967 | France | 178/6.6 A |

*Primary Examiner*—Bernard Konick
*Assistant Examiner*—Howard W. Britton
*Attorney*—Marechal, Biebel, French & Bugg

[57] ABSTRACT

The signal for every other line in a television signal is inverted, and the resultant signal is magnetically recorded and reproduced. Reinversion (or demodulation) switching, to restore the played back signal to its original form for reproduction, is controlled by an automatic frequency control circuit to maintain switching synchronization through the vertical intervals and periods of drop outs and noise.

15 Claims, 6 Drawing Figures

INVENTOR
KINGSTON E. GANSKE
BY
Marechal, Biebel, French & Bugg
ATTORNEYS

TELEVISION RECORDING SYSTEM WITH ALTERNATE PERIOD INVERSION AND AUTOMATIC FREQUENCY CONTROL

CROSS-REFERENCE TO RELATED APPLICATION

This application is related to U.S. Pat. application Ser. No. 556,099, filed June 8, 1966, entitled "Magnetic Recording and Apparatus Method," and assigned to the same assignee as the present application, now U.S. Pat. No. 3,586,768.

BACKGROUND OF THE INVENTION

This invention relates to a system for recording and playback of signals, primarily television signals, on magnetic recording apparatus. As disclosed in the earlier application identified above, a system for magnetically recording and reproducing electrical signals over a wide frequency range in the order to from DC to in excess of several megacycles, has been provided by processing the signal prior to recording, whereby the lowest frequency actually recorded is in the order of several kilocycles. This is accomplished particularly in the case of a television signal by inverting the signal for every other horizontal scan line and recording the signal in that form. Thus the frequency of inversion and reinversion is related to the horizontal scanning frequency of 15,750 kHz., and the timing is synchronized to the scanning sync pulses such that the inversion in the recorded signal occurs during the interval between picture information for successive lines. The signal actually recorded can readily be handled by the recording and playback transducers, and by the recording media itself, and furthermore the actual track width on the recording media is substantially less than previously required for signals having such a wide frequency range. This in turn permits closer spacing of different tracks on the magnetic tape or other media.

In the system where television signals are thus recorded and reproduced, it is necessary to reinvert the inverted parts of the recorded signal which are played back in order to restore the signal to its original form. This process can be referred to as a demodulation process, wherein the recorded signal is restored to the conventional form and then supplied to a television set for producing the picture. However, during the vertical interval the signal includes equalizing pulses and the vertical synchronizing pulse interval (a long pulse with a seration every half line) which is employed for the purpose of controlling the horizontal and vertical oscillators in an interlaced scan television system.

A reinversion system that uses separated horizontal sync to directly control signal reinversion, tends to lose synchronization during the vertical interval because it cannot distinguish the difference between equalizing pulses occurring at retrace and at midline. In addition any pulse noise or drop-outs which occur, will also tend to cause the signal to demodulate incorrectly.

SUMMARY OF THE INVENTION

According to the present invention, an automatic frequency control circuit (AFC) is provided with a relatively long time constant or stripped sync can be separated through a gated sync separator which eliminates midline pulses. The resulting circuit is insensitive to equalizing pulses and noise pulses which would tend to incorrectly demodulate the signal. The positive going horizontal synchronizing pulses are stripped from the reproduced signal, resulting in a reproduced 7.8 kHz. signal from which the AFC circuit generates a DC control voltage, which in turn phase locks a multivibrator circuit to the switched video. This AFC DC controlled 7.8 kHz. multivibrator output is used to control the demodulation switching. The feedback control of the AFC has a delay circuit which causes the phase of the multivibrator circuit to be correct with respect to the switched video. The multivibrator can be used directly to control switching or can be used in conjunction with an AND gate which also receives key pulses from the driven television set such that switching occurs at the correct switching position on the inverted lines.

The primary object of this invention, therefore, is to provide a novel demodulating circuit for recorded signals which have been inverted at regular intervals, including synchronizing signals which are recorded at the inverting frequency, wherein the synchronizing signals are separated from the replayed signal, used to key an automatic frequency control circuit which includes a multivibrator or oscillator driving the demodulating switching circuit to cause a reinversion of those alternate portions of the replayed signal which had been originally inverted for purposes of recording.

Other objects and advantages of the invention will be apparent from the following description, the accompanying drawings and the appended claims.

DESCRIPTION OF A PREFERRED EMBODIMENT

Figures 1, 5:
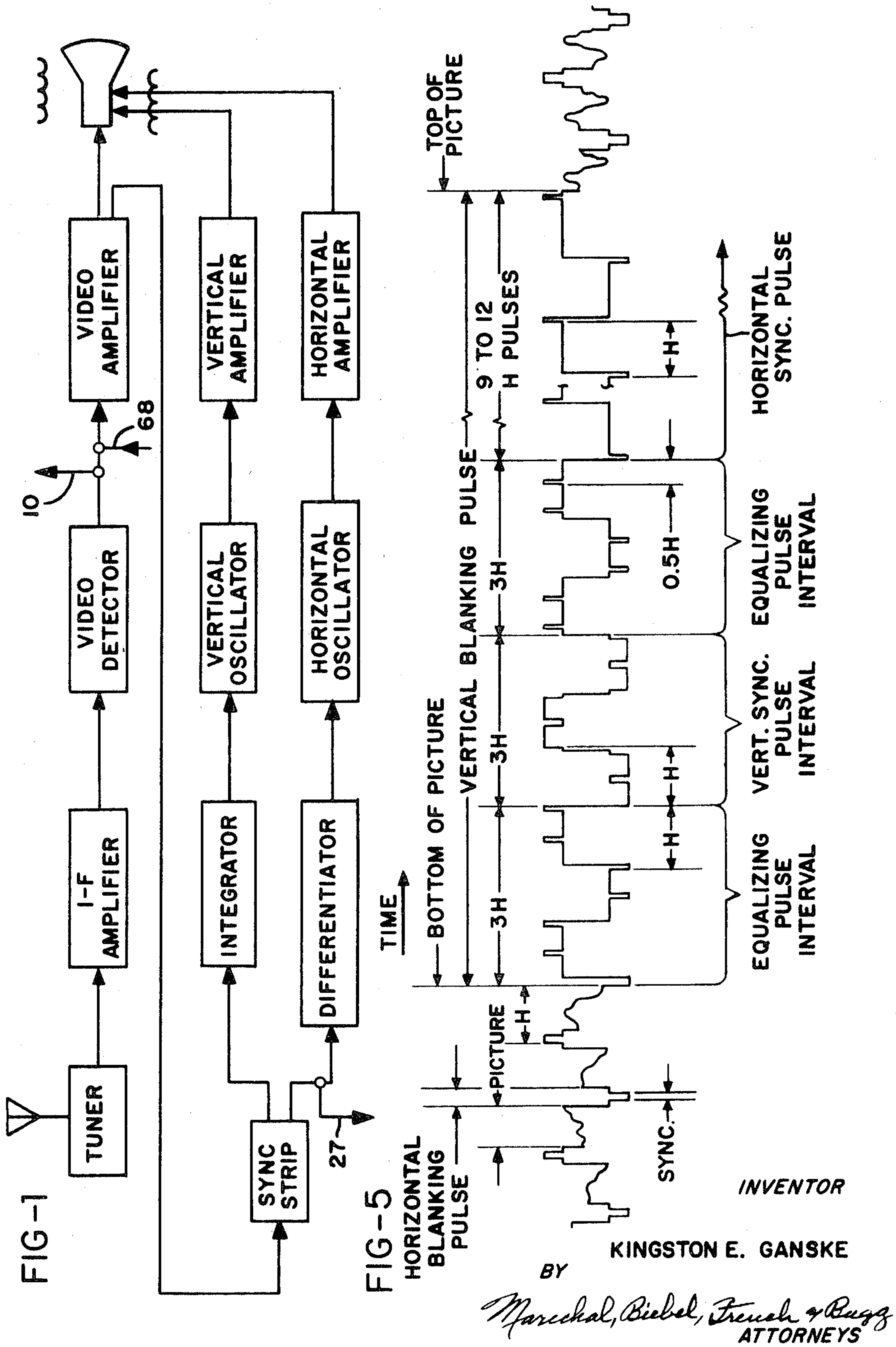
FIG. 1 is a block diagram of a typical television receiver, which is representative of the type of use to which the invention can be put.
FIG. 5 is a diagram of a typical regularly inverted and noninverted video signal which can be successfully reproduced by the method and apparatus of this invention.

Referring to the drawings, FIG. 1 shows in block diagram form a typical television receiver. As is well known, there is a horizontal blanking and sync signal following the video signal for each line, and the horizontal sync provides a triggering function by which the cathode-ray beam in the picture tube is caused to retrace rapidly before scanning the next line. The level of the signals is representative of the intensity of the cathode ray beam, between all white and all black, and as is noted and well known, the horizontal blanking signal is equivalent to approximately 100 percent black, and the horizontal sync pulse is of a greater amplitude, which is referred to as "blacker than black."

The vertical interval includes equalizing pulses and serations of the same amplitude as the horizontal sync pulses, but at a greater rate. The equalizing pulses and serations during the vertical sync pulse, as is well known, serve to control the horizontal oscillation during the vertical interval. In every other field the beginning of the vertical sync pulse must occur when a horizontal line is only half scanned. In effect, the interlaced scan system employs 525 horizontal lines per frame (262.5 lines per field).

In accordance with the invention, detected video input signals, as would be present on line 10, FIG. 1, are subjected to an alternative inversion, whereby signals to be recorded are changed alternately into negative and positive signals, and the frequency of inversion and reinversion is matched to the frequency of one half the horizontal line rate. As a result, effectively the lowest frequency which the recording and replay transducers must handle is the inversion frequency, i.e., about 7.8 kHz. The pattern of inversion is readily apparent from FIG. 5.

Figure 2:
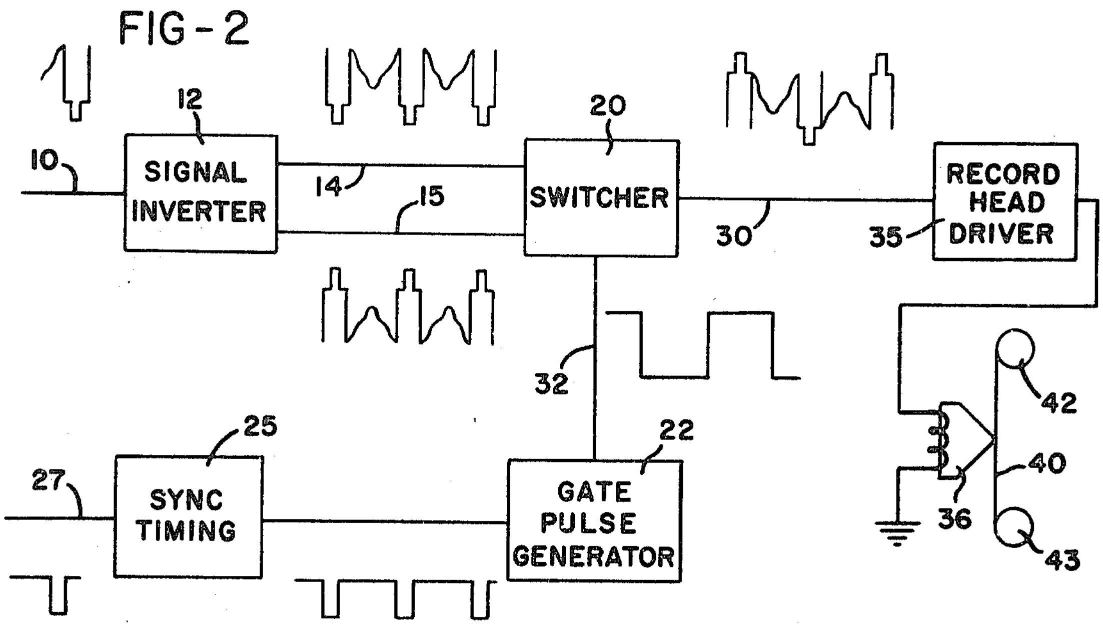
FIG. 2 is a block diagram of the recording system.

FIG. 2 shows in block diagram form, the recording part of the system, which is described in detail in said U.S. Pat. No. 3,586,768. The input signal on line 10 is applied to an inverter circuit 12. The signals as received are presented on output line 14, without inversion, and a second output line 15 presents the received signals completely inverted, as indicated by the representative video signal waveforms on FIG. 2. Both the original and the inverted signals are applied, through lines 14 and 15, to a switching circuit 20, which is keyed from a gate pulse generator 22, and this pulse generator in turn is keyed by the sync timing circuit 25, which may in turn receive keying signals from the sync control circuits of the television receiver, through line 27.

The sync timing circuitry assures that the gate pulse generator 22 inverts the television signal at the desired time, every other line. The switching preferably occurs coincidentally with the end of the horizontal blanking signal, sometimes referred to in the art as the "back porch" portion of the horizontal blanking signal, i.e., that part following the horizontal sync pulse. Thus, the gate pulse generator output on line 32 is applied to the switching circuit 20, with the result that the output 30 is rapidly switched between the two inputs 14 and 15. The resultant output signal may be of the type shown by the waveform above line 30 on FIG. 2. This signal is applied to the recording head driver circuit 35, and thence to the recording head or transducer 36, which in turn causes the signals to be recorded on the recording media, such as the magnetic tape 40 which is driven past the recording head from the supply reel 42 to the takeup reel 43.

Figures 3, 6:
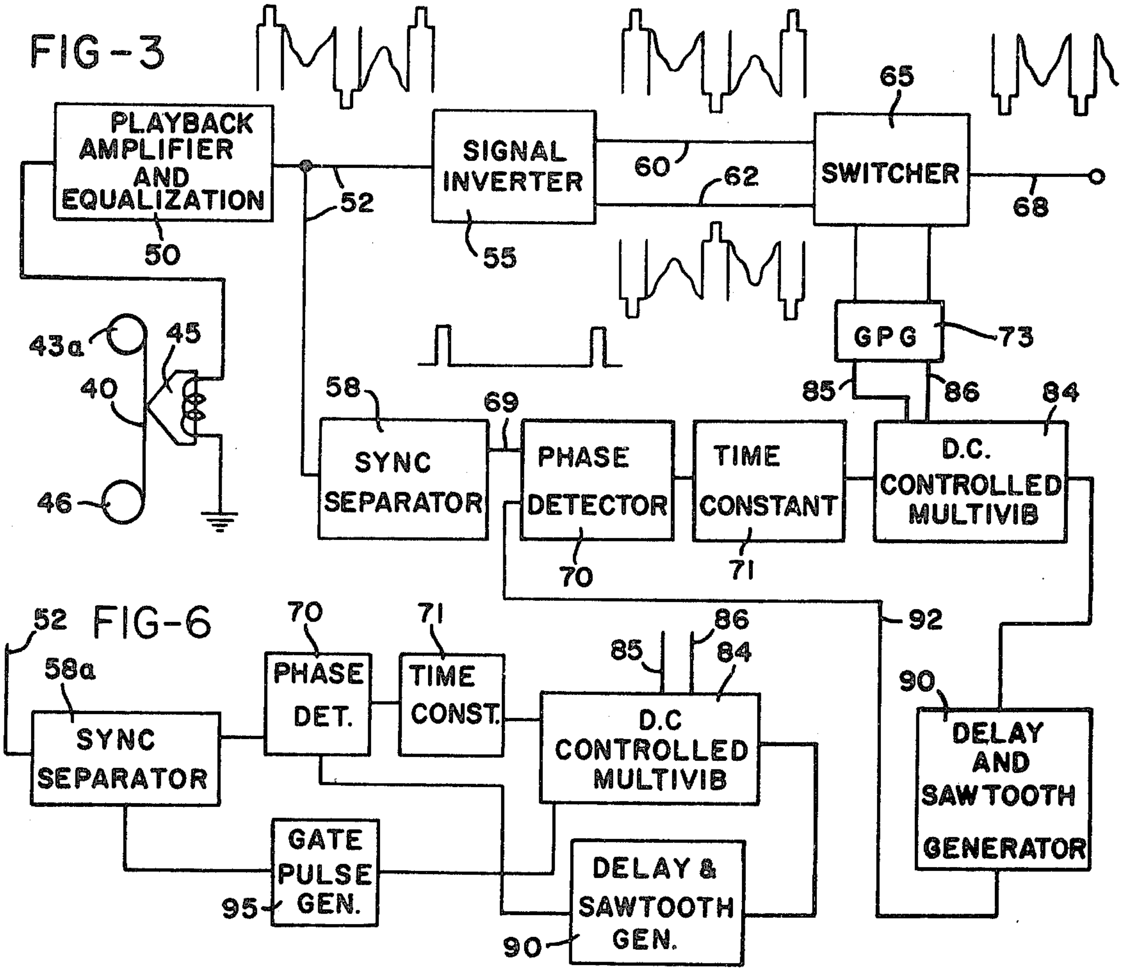
FIG. 3 is a block diagram of an improved playback system according to the invention.
FIG. 6 is a block diagram of a modification in the playback system.

To replay this recorded signal it is necessary to demodulate by reinverting those portions of the original input signal which have been inverted. In the case of video recording this means inverting signals for every other line. FIG. 3 is a block diagram of the improved playback arrangement for this purpose provided by this invention. The recording media or tape 40 is traversed past a playback transducer or head 45, moving from the supply reel 43*a* to the takeup reel 46.

Figure 4:
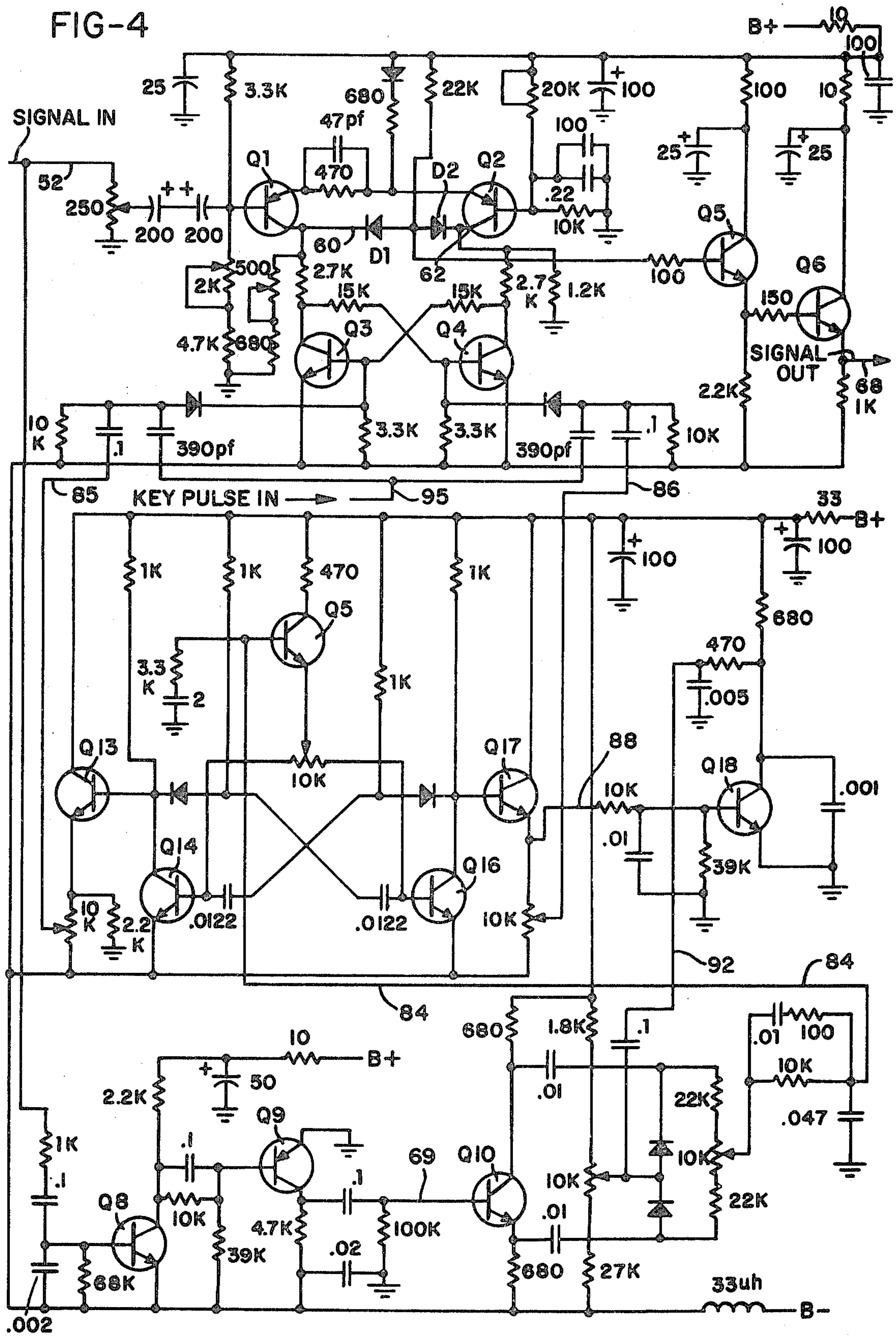
FIG. 4 is a schematic diagram of the playback system.

The output of the playback head 45 is directed to a conventional playback amplifier 50, which incorporates equalization circuits for the particular playback head. The output of the playback amplifier on line 52 is directed to an inverter circuit 55 and also to a sync separator circuit 58. Details of typical such circuits are shown in FIG. 4. The circuit 55 provides two outputs on lines 60 and 62 respectively. The former is the same signal as received from line 52, and the signal on line 62 is completely inverted.

These signals are alternatively applied, under control of the switching circuit 65, to combine portions of each and produce a faithful reproduction of the original signal on the output line 68. This output line in turn can be coupled to the input of the video amplifier in a television receiver, as shown in FIG. 1. The sync separator and timing circuit 58 is adapted to detect the positive horizontal sync pulses from the input on line 52, and to produce therefrom a 7.8 kHz. signal on line 69, which in turn is fed to a phase detector circuit 70. The phase detector circuit in turn controls, through time constant circuit 71, the frequency of a multivibrator or oscillator circuit 72 that controls a gate pulse generator 73, thus providing a square wave switching signal which controls the switching circuit 65 to reinvert the inverted portions of the transmitted signal on the output 68, thereby restoring the inverted signal to its original condition, such as received at line 10 on the recording system, FIG. 2.

FIG. 4 is a schematic diagram of a typical playback circuit which has been successfully operated in accordance with the invention. All values of capacitors are given in microfarads unless otherwise indicated, and all values of resistors are in ohms unless otherwise designated. The type designations of the transistors are as follows:

| | | | | | |
|---|---|---|---|---|---|
| Q1 | 3638 | Q6 | 3641 | Q14 | 3641 |
| Q2 | 3638 | Q8 | 1308 | Q15 | 3641 |
| Q3 | 3641 | Q9 | 3641 | Q16 | 3643 |
| Q4 | 3641 | Q10 | 3643 | Q17 | 3641 |
| Q5 | 3643 | Q13 | 3641 | Q18 | 3643 |

The signal from the playback amplifier 50 is fed over line 52 to the inverting and switching circuits, comprised of the transistors Q1 and Q2 together with the components connected thereto. At the same time this signal is transmitted to the sync separator circuit comprised of transistor Q8 and Q9, and the circuitry connected to these transistors.

Transistors Q3 and Q4, with the components connected thereto, comprise an AND gate switching control which forms the gate pulse generator 73. The output, in which the noninverted signal is not acted upon the inverted portion of the signal is reinverted, is over line 68 from the emitter follower output circuit, comprised of transistors Q5, Q6 and the components connected to these. The demodulated signal is then transmitted for subsequent reproduction over the output line 68.

The sync separator circuit separates sync pulses going in one direction only, for example only the positive going sync pulse as indicated by the waveform on FIG. 3. Because of the alternate inversion of the incoming signal, the rate of the sync separator output, over line 69 to the base of transistor Q10, is at a rate of 7.8 kHz. Transistor Q10 and the connected components, shown in the lower right corner of FIG. 4, comprise a phase detector circuit 70 and DC time constant circuit 71. The output of this circuit over line 84 leads to the base of transistor Q15, which controls the 7.8 kHz. multivibrator Q14 and Q16. Q13 and Q17 are emitter followers which drive the gate pulse generator Q3 and Q4 for control of the reinversion of the inverted portions of the incoming signal.

In addition, the signal on line 86 is connected over line 88 to the input of Q18. This transistor and associated circuits provide delay of the signal on line 88 and also shapes it into a proper sawtooth thus comprising the delay and sawtooth generator. The output from the delay and sawtooth generator is taken by line 92 to the phase detector circuit.

The phase detector circuit 70, time constant circuit 71, multivibrator 72, and the delay and sawtooth generator circuit 90, cooperate to provide an automatic frequency control circuit which ultimately controls the operation of the switching circuit 65. In the embodiment shown this control is provided via the gate pulse generator 73, although the control can be direct to the switching circuit by changing the delay of the generated sawtooth and elimination of the AND gate, as later explained.

In a preferred embodiment of the invention the gate pulse generator circuits, including transistors Q3 and Q4, are employed and are gated through the introduction of a key pulse signal on line 95. This signal may be derived from the horizontal key pulse circuit of a television set reproducing a picture from the output signal on line 68. It should be understood, however, that use of this key pulse gating circuit is not essential, and satisfactory operation of the system has been obtained without its use by changing the phase of the multivibrator. This is accomplished by changing the delay in circuit 90. The multivibrator then is the only control and can drive the switching circuits directly by elimination of the AND ate function.

It is also possible, when operating with or without the key pulse signal to operate the AFC circuit with shorter time constants, by providing a gated sync separator which allows only wanted sync signals to pass to the AFC circuit. FIG. 6 shows a modification wherein a second gate pulse generator 92 is controlled by the DC controlled multivibrator 84. The generator 95 in turn controls a gated sync separator circuit 58*a* which passes only wanted sync and which at other times blocks the input signal to the AFC circuit.

Reviewing briefly the operation of the demodulating circuitry, the signal coming from the playback amplifier has the regularly inverted waveform as shown generally in FIG. 5. For purposes of explanation it will be assumed that it is desired to reinvert all portions of the signal which have positive going sync pulse components, and thus to restore the signal to a condition comparable to the original signal supplied from the video detector circuit, on line 10. The sync separator circuit strips only the positive going sync pulses from the incoming signal on line 52, and these are coupled to the phase detector and time constant circuits which in turn control the 7.8 kHz. multivibrator 72. Gate signals are fed to the gate pulse generator via multivibrator emitter followers Q13 and Q17 to the gate pulse generators which alternately control the switching control transistors Q1 and Q2. Since these circuits are coupled through diodes D1 and D2 to the emitter follower output to line 68, depending upon which of the gate pulse generator transistor Q3 or Q4 is gated on, one or the other of these diodes will be biased to a nonconducting condition, while a signal will be transmitted through the other driving to the emitter follower output to line 68.

The multivibrator operates in a stable fashion at 7.8 kHz., is accurately phase locked to stripped sync during the picture portion of the signal and maintains this accurate phase lock during the period of equalizing pulses and vertical sync pulse serrations due to the operation of the AFC and the time constant circuit 71.

If extraneous pulses occur due to pulse noise or tape dropouts, the time constant 71 provides sufficient integration of the control voltage on line 84 to prevent the phase of the multivibrator from changing sufficiently to cause incorrect demodulation of the signal on line 68. In practice the circuits have been found to accurately demodulate the signal through the vertical interval and be very noise immune to all types of pulse noise, thereby giving a picture on the television cathode ray tube free of tearing or any other visible form of distortion due to incorrect demodulation.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a recording system wherein a recording media carries a wide frequency spectrum signal which is regularly inverted and reinverted at a predetermined constant frequency, said system including a playback transducer and an amplifier operative to reproduce the signal recorded on the media, a signal inverting circuit connected to receive the signal reproduced by said playback transducer, outputs from said amplifier and said inverting circuit on which the reproduced signal appears both as reproduced and in inverted form, a playback switching circuit controlling both said outputs and having a signal output over which the restored reproduced signal is ultimately transmitted, and a sync separator circuit arranged to produce control timing pulses from the reproduced signal; the improvement comprising an automatic frequency control circuit controlled by said sync separator circuit and operative to control the switching of said playback switching circuit whereby the inverted portions of the original signal are restored prior to reproduction and transmission over said playback circuit output.

2. A recording system as defined in claim 1, wherein said automatic frequency control circuit includes a time constant circuit maintaining stable controlled operation of said switching circuit.

3. In a recording system wherein a television signal is recorded as a regularly inverted and noninverted signal which has inverted portions corresponding in length and synchronized to the picture-synchronizing signal for a single scan, apparatus for restoring the recorded signal to correspondence with its original form to produce an output signal suitable for reproduction through a television set, said apparatus comprising a. transducer means for reproducing the recorded signal, b. amplifier means including an inverter and having alternate outputs on which the reproduced signal is available directly and in inverted form, c. switching circuit means controlling the transmission of said reproduced signals selectively from said amplifier means, d. a gate pulse generator controlling said switching circuit means, e. an automatic frequency control circuit driving said gate pulse generator, and f. means controlling said automatic frequency control circuit from the synchronizing portion of the reproduced signal.

4. A recording system as defined in claim 3, wherein said gate pulse generator is an AND gate circuit controlling said switching circuit means, and an input to said AND gate circuit for supplying a key pulse from the horizontal scanning circuit of a television set receiving the output signal.

5. A recording system as defined in claim 3, wherein said automatic frequency control incorporates said gate pulse generator and is connected directly to drive said switching circuit means.

6. A system as defined in claim 3, including a gating sync separator circuit provides the means controlling the automatic frequency control circuit, a second gate pulse generator connected to control said sync separator circuit, and a circuit connection controlling said second gate pulse generator from said automatic frequency control circuit.

7. A system as defined in claim 6 wherein said AFC includes a multivibrator circuit providing control signals to the first gate pulse generator to control operation of said switching circuit, and a connection from said multivibrator circuit providing a control connection to said second gate pulse generator.

8. In a signal recording and reproducing system incorporating means providing a video signal source for developing a video signal, signal recording means, means modifying said video signal coupled between said video signal source and said signal recording means for inverting the polarity of first portions of said video signal with respect to other portions thereof at a rate equal to half the line scan rate of the video signal, playback means including a playback transducer for reproducing the recorded video signal, switching circuit means coupled between said playback transducer and said playback means for synchronously inverting the polarity of said first portions of said recorded video signal at said rate to derive a restored signal corresponding to the original video signal before modification, the improvement comprising, a switching circuit incorporated in said restoring means, an automatic frequency control circuit controlling the operation of said switching circuit means, a sync separator circuit receiving the regularly inverted signal from the playback transducer and connected to key said automatic frequency control circuit at the rate of inversion, said automatic frequency control circuit having sufficient time constant to be immune from mid-line equalizing pulses and pulse noise.

9. A signal recording and reproducing system as defined in claim 8, including an AND gate circuit connected to drive said switching circuit and functioning as a gate pulse generator, said AND gate circuit having one input from said automatic frequency control circuit, and means providing a key pulse input to said AND gate circuit from a television set operating from the restored signal.

10. A signal recording and reproducing system as defined in claim 8, said automatic frequency circuit including a multivibrator circuit functioning as a gate pulse generator and connected to drive said switching circuit means.

11. The method of demodulating for restoring a video signal which had first portions corresponding to every other line inverted with respect to second portions corresponding to the intervening lines, comprising receiving the incoming signal with such inverted first portions and inverting the entire such signal, switching an output circuit between inputs from the incoming signal and its inversion, controlling the switching through an automatic frequency control circuit operating at the frequency at which said first signal portions occur, automatically controlling the phase of the automatic frequency control circuit to stabilize the switching operation, and employing sync signals from the incoming signal to key the automatic frequency control for proper phasing of the switching operation.

12. The method of restoring a video signal as defined in claim 11, including providing in the automatic frequency control circuit a time constant circuit sufficient to make the automatic frequency control circuit immune to midline equalizing pulses and noise pulses.

13. The method of restoring a video signal as defined in claim 11 including gating the switching of the output circuit through an AND gate circuit respective to the automatic frequency control circuit and to the horizontal scanning circuit frequency of a television set operating from the restored video signal.

14. The method of restoring a video signal as defined in claim 11, wherein the automatic frequency control circuit operates through a multivibrator included therein to provide the sole driving control for controlling the switching operation.

15. The method of restoring a video signal as defined in claim 11, wherein the AFC provides a control for gating separated sync to omit unwanted separated sync signals from the control input to the AFC.

* * * * *